Patented Nov. 13, 1951

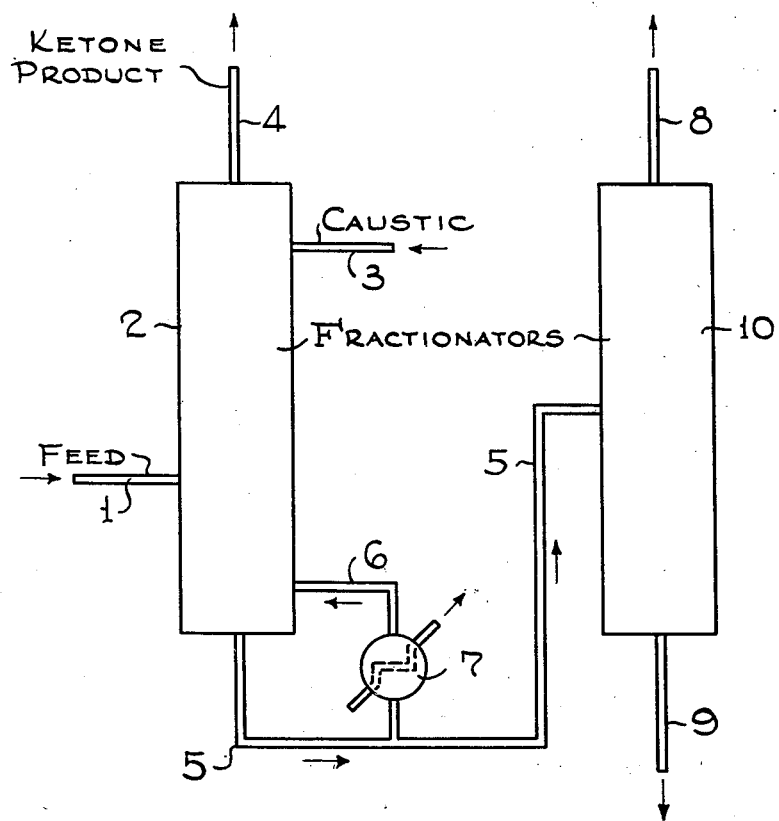

2,575,244

UNITED STATES PATENT OFFICE 2,575,244

PROCESS FOR SEPARATING KETONES FROM CLOSE-BOILING MIXTURES

Carl S. Carlson, Elizabeth, and Paul V. Smith, Jr., Westfield, N. J., assignors to Standard Oil Development Company, a corporation of Delaware Application September 8, 1948, Serial No. 48,224

10 Claims. (Cl. 202—39.5)

This invention relates to a practical method of separating ketones from close-boiling oxygenated compound mixtures, such as mixtures of ketones, aldehydes and alcohols, mixtures of ketones, aldehydes and esters, etc. The invention is concerned with the controlled use of aqueous alkali such as aqueous caustic or aqueous ammonia, as a refluxing medium in the fractional distillation of the multi-component close-boiling oxygenated compound mixtures.

Numerous processes are known in the chemical art in which mixtures of organic oxygenated compounds, particularly aliphatic oxygenated compounds are produced. Such processes are exemplified by the well-known Fischer Synthesis reaction in which oxides of carbon are reacted with hydrogen in the presence of a catalyst; the "oxo" process wherein olefin hydrocarbons are reacted with carbon monoxide in the presence of a catalyst; the various processes involving the oxidation of aliphatic hydrocarbons, dehydrogenation of alcohols, etc. Products obtained from reactions of this type usually consist of mixtures of oxygenated compounds such as alcohols, aldehydes, ketones, esters, etc. These mixtures are often difficult to separate by straight fractional distillation because of their close-boiling points, and secondly, because of their tendency to form azeotropes, particularly when the fractional distillation of the mixture is attempted while the mixture is in the aqueous condition.

It has been found that when such mixtures containing ketones, aldehydes, esters, and alcohols are subjected to distillation in the presence of aqueous alkali as a refluxing medium, it is possible to recover an overhead product from the distillation zone consisting substantially of ketones. During this process, which may be termed an extractive distillation process, the aqueous alkali causes the aldehydes to undergo aldolization, saponifies the esters, and so modifies the volatility of the alcohols that they are retained as bottoms in the distillation zone during the distillation process. In order to successfully accomplish the separation of ketones from the mixtures described by this process, it is necessary to maintain the pH in the distillation zone between 7.1 and 12.5. A pH value greater than 12.5 has been found to cause the ketones to enter into the aldol condensation along with the aldehydes. It is also necessary during the operation of this process to use sufficient aqueous alkali as the refluxing medium or extractive distillation solvent so that a concentration of water of 50 mol per cent to 75 mol per cent is present at all times in the liquid phase in the column. This water concentration is necessary in order to repress the volatility of the alcohols to the extent that they are retained as bottoms in the distillation zone and their distillation overhead with the ketones is prevented. At water concentrations above 75 mol per cent, the volatility of the aldol condensation product increases more rapidly than the volatility of the ketone until a point is reached where it is actually more volatile than the ketone, and the separation is reversed. At water concentrations below 50 mol per cent, the volatility of the alcohols present is not sufficiently repressed to retain them as bottoms in the distillation zone and allow the ketones to go overhead.

When the separation of ketones from a mixture of ketones, esters, aldehydes and alcohols is attempted by distillation in the presence of water as the refluxing medium, the composition of the overhead vapors may be controlled so as to produce any one of the following separations:

1. Alcohols as bottoms—ketones, aldehydes and esters overhead.
2. Alcohols and ketones as bottoms—aldehydes and esters overhead.
3. Alcohols, aldehydes and ketones as bottoms—esters overhead.

Although the above separations are possible, it is seen that none of them allows the separation of the ketones alone. One or two additional water extractive distillations are required to secure the ketones alone. For example, the ketones may be separated from the overhead from #1 by a second water extractive distillation wherein the aldehydes and esters are recovered overhead and the ketones as bottoms. In #2, the bottoms consisting of alcohols and ketones can be subjected to another water extractive distillation process to permit recovery of ketones overhead and alcohols as bottoms. In #3, two additional water extractive distillations are required to recover the ketones alone, viz., a first distillation to recover the aldehydes overhead, and a second distillation to split the ketones overhead from the alcohols.

It is also to be noted that the separation of ketones from such a mixture cannot be accomplished by the addition of caustic to the feed and subsequent distillation of the feed by ordinary fractional distillation. Such a procedure would result in an overhead mixture of ketones and alcohols distilling from the fractional distillation zone.

Thus, it is seen that the recovery of ketones alone from such a mixture is a difficult and drawn-out process. These difficulties are obviated and the recovery of a ketone-rich fraction from such mixtures is made possible in one distillation step by carrying out the distillation of the mixture in the presence of dilute aqueous alkali as a refluxing medium at a pH of 7.1 to 12.5.

To obtain the desired separation of ketones from the mixtures mentioned, the mixture is subjected to continuous fractional distillation in a column of practical size, including a primary rectification zone, a secondary rectification zone above the primary zone, and a stripping zone below the primary zone for countercurrent vapor-liquid contact under reboiling and refluxing conditions. A sufficiently large quantity of aqueous caustic is introduced at the upper part of the primary rectification zone to effectively modify the relative volatility of the alcohols in the mixture undergoing distillation, and to induce aldolization of the aldehydes and saponification of the esters. The aldol condensation product being of higher molecular weight and being relatively non-volatile, settles to the bottom of the distillation tower. The esters are converted to alcohols and non-volatile salts of the acids resulting from the saponification. Thus, it is possible to recover from the distillation zone a larger proportion of ketone as distillate than of any of the other components of the mixture.

The separation can be effected in a continuous manner under steady state conditions to obtain product streams of desired purities and constant composition while supplying large quantities of aqueous alkali to the upper part of the primary rectification zone. The temperature of the aqueous alkali introduced into the rectification zone is preferably close to the temperature of the liquid on the plate at the point of addition of the alkali, although it may be lowered to partially condense vapors ascending to the solvent feed plate.

Since the efficient operation is essentially continuous the aqueous alkali is added continuously near the top of the primary rectification zone of the tower while the mixture of organic oxygenated compounds to be separated is fed continuously into the tower at a lower point while sufficient heat is provided to afford distillation throughout the tower. The oxygenated compounds are preferably fed to the fractionating tower between the primary rectification zone and the lower stripping zone where the ratio of the main organic compounds to be separated in the feed is similar to the ratio of these compounds in the internal liquid reflux descending through the column. The oxygenated compound feed mixture may be preheated to a temperature close to that of the internal liquid reflux under practically equilibrium boiling conditions at the point of introduction. The preheated feed stream may be liquid, partially vaporized or totally vaporized when introduced into the fractionation tower. The oxygenated compound feed mixture may contain amounts of water greater than, less than, or equal to the amounts corresponding to azeotropic compositions, but in any case it must be at all times completely miscible with the aqueous alkali in the fractionation tower.

Vapors of the oxygenated compounds being distilled pass up through the primary rectification zone and come into contact with descending internal aqueous alkaline liquid reflux. Immediately, the aldehydes enter into aldol condensation under the influence of the alkali and the resulting high molecular weight aldols settle to the bottom of the tower. The esters become saponified to alcohols and acids; the latter are immediately converted to non-volatile salts in the presence of the caustic. The alcohols and ketones then remain as volatile components. By the action of the aqueous alkaline solvent containing at least 50 mol per cent water and by adding sufficient alkaline solution to maintain a pH of 7.1 to 12.5 throughout the fractionation tower, the aldolization of the ketone is prevented, and the volatility of the alcohols is so repressed that an overhead, substantially rich in ketone, can be recovered from the fractionation tower. The solvent volume employed will depend upon its alkaline strength and water content of the mixture being distilled. These volumes can be adjusted so that the required solvent concentration and pH in the tower can be realized.

The aqueous alkaline extractive distillation solvent employed may be any one or combination of the usual alkalis by which term is meant the hydroxides and carbonates of sodium, potassium, lithium, cesium, and ammonia. Extremely suitable are sodium hydroxide, potassium hydroxide, sodium carbonate, potassium carbonate, and ammonium hydroxide, the last named when used under superatmospheric pressure.

The following description and attached drawing set forth in detail certain embodiments of the invention which are indicative only of the various ways in which the principle of the invention may be employed.

The invention will be described in detail as applied to the separation of ketones from a close boiling mixture of ketones, alcohols, aldehydes and esters.

Referring to the drawing, a close boiling mixture of ketones, alcohols, aldehydes, and esters, either aqueous or anhydrous, is introduced by line 1 into fractionation column 2. Aqueous caustic in a liquid stream is introduced into tower 2 via line 3 at a point several plates below the top of the tower and at a point considerably above the point of addition of the oxygenated compound feed mixture. Conditions in the tower are such as to cause a distillation of the ketones in the presence of the aqueous caustic on each plate of the tower. Sufficient aqueous alkali, e. g., sodium hydroxide, is introduced into the tower through line 3 so that a concentration of water of 50 mol per cent to 75 mol per cent is present at all times in the liquid phase in the column. The amount of caustic added is likewise also controlled to produce a pH of 7.1 to 12.5 in the tower at all times. Sufficient heat is applied to the mixture in the distillation tower to cause evolution of vapors of the feed mixture. When the ascending vapors come into contact with the descending internal aqueous caustic liquid reflux, the aldehydes are converted to aldol condensation products, which are of high molecular weight and which pass to the bottom of the tower. The esters in the mixture are hydrolyzed by the action of the caustic to alcohols and acids. The acids are immediately converted to volatile salts by the action of the caustic. The aqueous caustic reflux so modifies the volatility of the alcohols that they remain behind in the fractionation tower, leaving an overhead consisting substantially of ketones distilling from the tower. Conditions maintained on each plate of the tower are such that the liquid mixtures of the ketones and alcohols are at their boiling points and are continuously being contacted with vapors emerging from the plates below. Because of the increased volatility of the ketones in relation to the alcohols, the vapors ascending through the tower are relatively richer in ketones and poorer in alcohols. By maintaining the amount of aqueous caustic on each plate so that the proper dilution is approached, the optimum relative volatilities for the separation of ketones and alcohols can be secured. Furthermore, by controlling the external reflux ratio and the number of plates within the tower, the actual degree of separation may be varied until the desired product purity and recovery are obtained. Thus, suitable temperature and reflux conditions are maintained in the tower so that substantially pure ketones appear in the overhead stream and a solution of alcohols, aldol condensation products and salts of the acids yielded on the saponification of the esters appear in the bottoms product.

Returning to the drawing, overhead vapors consisting substantially of pure ketones and water are removed from the top of tower 2 through line 4, after which they are condensed and the condensate collected. A portion of the condensate may be returned to the tower 2 as reflux. The bottoms, whose composition has been previously described, are passed from the tower 2 via line 5 to tower 10 for further recovery of alcohols therefrom. A portion of the bottoms product being removed from tower 2 through line 5 may be passed into reboiler 7 for heating by indirect or direct heat exchange with a heating medium such as live steam. A portion of the liquid bottoms heated and partially vaporized in reboiler 7 is recycled via line 6 to the lower part of tower 2. In tower 10 the bottoms delivered thereto from tower 2, are subjected to further distillation whereby the alcohols are recovered overhead via line 8 in the form of their aqueous azeotropes, while bottoms consisting of aldol condensation products and salts of the organic acids originally present in the esters are removed from the tower 10 via line 9. These bottoms from tower 10 may be treated for further recovery of aldehydes and acids therefrom, if desired. However, the latter does not constitute a part of this invention.

The distillation operation may be conducted at atmospheric, super-atmospheric, or sub-atmospheric pressures, and in the presence of solubilizers such as low molecular weight alcohols.

*Example 1*

In order to determine whether or not the rate of aldolization of aldehydes would be rapid enough to enable the desired separation to occur in the fractional distillation zone, experimental aldolization rate studies were carried out on a normal butyraldehyde - methyl - ethyl - ketone mixture. Fractionation of such a mixture in the presence of water yields an overhead high in normal butyraldehyde (B. P. of water azeotrope—68.0° C.). In the presence of caustic solution, however, aldolization of the normal butyraldehyde takes place with the result that the overhead is high in MEK (B. P. of water azeotrope—73.4° C.).

The experimental work was carried out on a 50-50 volume per cent blend of butyraldehyde-methyl-ethyl-ketone as representative of actual operation. First the distillation was run batchwise in a one inch diameter, three foot long, glass column packed with 3/32" stainless steel helices, and equivalent to about 35 theoretical plates. During the fractional distillation, a product comprising 86.4 weight (or mol) per cent aldehyde and 13.6 per cent ketone came overhead at 69.0° C. When 0.5 N sodium hydroxide (pH 12.3) was added to the top of the column at 54 cc./hr., the overhead temperature climbed to 73.5° C. while the composition changed to 47.0 weight (or mol) per cent butyraldehyde and 53.0 per cent MEK.

*Example 2*

The experiment was repeated in a continuous flow unit comprising a 60 perforated plate 1" diameter column, a bellows pump for feed addition on the 30th plate, and another one for caustic addition on the top plate. The feed as well as the pot charge was 50-50 volume per cent normal butyraldehyde-MEK, while the caustic strength was 0.5 N. With organic feed alone added, the overhead composition was 33.7 per cent ketone and 66.3 per cent aldehyde, while the overhead vapor temperature was 68.0° F. After 0.5 N caustic was added at about 112 cc./hr. for an hour, the temperature rose to 72° C. and the overhead then contained 80.4 per cent ketone and 19.6 per cent aldehyde. Both organic and caustic feed were discontinued and the run was continued for three hours as a batch operation. The overhead vapor temperature dropped to 67° C. and the overhead product analyzed 93.9 per cent butyraldehyde and 6.1 per cent MEK.

During continuous operation, in the absence of caustic with 54 volume per cent taken overhead, 38.1 weight per cent of the overhead was methyl ethyl ketone. When caustic was added at the rate of 0.04 mol NaOH per mol MEK, and only 7.3 volume per cent was taken overhead, 80.4 weight per cent of the overhead was MEK. Under these conditions, there were 0.14 mol NaOH per mol of butyraldehyde on the top plate. These results indicate that caustic addition during fractionation causes aldolization of butyraldehyde and makes possible the removal of ketone in at least 81-83 per cent purity. All percentages employed above are on an anhydrous basis.

*Example 3*

A synthetic blend was prepared as a feed mixture so as to contain approximately 45 volume per cent each of isopropanol and methyl ethyl ketone and 5 volume per cent each of n-butyraldehyde and ethyl acetate. The actual chemical analyses of the feed and overhead product are listed below:

|  | Feed, Wt. Per Cent | Overhead, Wt. Per Cent |
|---|---|---|
| Methyl ethyl ketone | 39.8 | 81.9 |
| Isopropanol | 35.9 | 0.9 |
| n-Butyraldehyde | 10.0 | 4.7 |
| Ethyl acetate | 6.5 | 0.7 |
| Water | 7.8 | 11.0 |

The extractive distillation was carried out employing 0.5 normal caustic as solvent, maintaining 73 mol per cent solvent on the top plate of the column. 43 volume per cent of the organic matter (containing 11 weight per cent water) in the feed was taken overhead at a reflux ratio of 5 to 1. The organic feed rate was 193 ml. per hour, the caustic feed rate was 205 ml. per hour, while the overhead rate was 83 ml. per hour.

Examination of the above data will show there was a marked enrichment of the ketone in the overhead while the alcohol, aldehyde, and ester were decreased markedly in concentration. The ketone yield in this run was 88.4%. The purity of the product can be improved by providing additional fractionation, or by taking a slightly lower yield of ketone.

Based on chemical type analysis of both feed, overhead and partial analysis of the bottoms, the following distribution of the various components was obtained:

| Component | Wt. Per Cent Appearing in— | |
|---|---|---|
| | Overhead | Bottoms |
| Isopropanol | 1 | 99 |
| Methyl ethyl ketone | 87 | 13 |
| Butyraldehyde | 20 | ¹ 80 |
| Ethyl Acetate | 5 | ² none |

¹ As a condensation product.
² Ester saponified to alchol and sodium acetate.

In addition to the examples cited, the invention may be applied to separation of other mixtures of comparatively low molecular weight oxygenated compounds such as those recovered from the Fischer Synthesis. Typical mixtures which may be treated by the process of this invention include:

(a) Acetone cut including in addition to acetone, one or more of the following: propionaldehyde, butyraldehyde, methanol, MEK, methyl acetate, ethyl acetate, and ethanol, (b) Methyl ethyl ketone cut, including in addition to MEK one or more of the following: ethanol, isopropanol, tertiary butanol, n-propanol, methyl-n-propyl ketone, diethyl ketone, butyraldehyde, valeraldehyde, n-propyl acetate, and ethyl propionate, (c) Methyl n-propyl ketone cut, including in addition to the ketone one or more of the following: diethyl ketone, sec-butanol, iso-butanol, n-butanol, n-propanol, t-amyl alcohol, hexaldehyde, n-propyl propionate, butyl acetates, and butyl propionates.

In addition to the above cuts from the hydrocarbon synthesis, other mixtures may be treated such as a mixture of methyl ethyl ketone with sec-butanol and isobutane as obtained in the catalytic dehydrogenation of sec-butanol; mixtures of isopropanol and acetone obtained in the dehydrogenation of isopropanol, mixtures of methyl propyl ketone and secondary amyl alcohols, etc.

Having described the invention in a manner so that it may be employed by one skilled in the art,

What is claimed is:

1. The method of separating a ketone from a mixture of ketone, aldehyde, alcohol, and ester components difficult to separate by ordinary fractional distillation and which boil in the boiling range of aqueous $C_1$ to $C_5$ alcohols, which comprises introducing the mixture into a fractional distillation zone, introducing sufficient aqueous alkali solution into the fractional distillation zone at a point substantially above the feed point of the mixture to maintain an internal liquid reflux having a water content of 50 mol per cent to 75 mol per cent below the point of addition of the aqueous alkali and to maintain a pH of 7.1 to 12.5 in the fractional distillation zone during the distillation, distilling from said feed mixture a vaporous mixture which flows countercurrent to the aqueous alkali reflux, and withdrawing overhead from said fractional distillation zone a vapor product of the ketone substantially freed of the aldehyde, alcohol and ester components.

2. A process according to claim 1 in which the aqueous alkali solution is aqueous sodium hydroxide.

3. The method of separating a $C_3$ to $C_5$ ketone from a mixture of ketone, aldehyde and alcohol components difficult to separate by ordinary fractional distillation and which boil in the boiling range of aqueous $C_1$ to $C_5$ alcohols, which comprises introducing the mixture into a fractional distillation zone, introducing sufficient aqueous alkali solution into the fractional distillation zone at a point substantially above the feed point of the mixture to maintain an internal liquid reflux, having a water content of 50 mol per cent to 75 mol per cent below the point of addition of the aqueous alkali and to maintain a pH of 7.1 and 12.5 in the fractional distillation zone during the distillation, distilling from said feed mixture a vaporous mixture which flows countercurrent to the aqueous alkali reflux, and withdrawing overhead from said fractional distillation zone a vapor product of the ketone substantially freed of the aldehyde and alcohol components.

4. A process according to claim 3 in which the aqueous alkali solution is aqueous sodium hydroxide.

5. The process of separating methyl ethyl ketone from a mixture of methyl ethyl ketone, n-butyraldehyde, ethyl acetate and isopropyl alcohol components difficult to separate by ordinary fractional distillation, which comprises introducing the mixture into a fractional distillation zone, introducing sufficient aqueous alkali solution into the fractional distillation zone at a point substantially above the feed point of the mixture to maintain an internal liquid reflux having a water content of 50 mol per cent to 75 mol per cent below the point of addition of the aqueous alkali and to maintain a pH of 7.1 to 12.5 in the fractional distillation zone during the distillation, distilling from said feed mixture a vaporous mixture which flows countercurrent to the aqueous alkali reflux and withdrawing overhead from the fractional distillation zone methyl ethyl ketone substantially free of n-butyraldehyde, isopropyl alcohol and ethyl acetate.

6. A process according to claim 5 in which the aqueous alkali solution is aqueous sodium hydroxide.

7. The method of separating methyl ethyl ketone from a mixture thereof with normal butyraldehyde, which mixture is difficult to separate by ordinary fractional distillation, which comprises introducing the mixture into a fractional distillation zone, introducing sufficient aqueous alkali solution into the fractional distillation zone at a point substantially above the feed point of the mixture to maintain an internal liquid reflux having a water content of 50 mol per cent to 75 mol per cent below the point of addition of the aqueous alkali and to maintain a pH of 7.1 to 12.5 in the fractional distillation zone during the distillation, distilling from said feed mixture a vaporous mixture which flows countercurrent to the aqueous alkali reflux and withdrawing overhead from the fractional distillation zone methyl ethyl ketone substantially free of normal butyraldehyde.

8. A process according to claim 7 in which the aqueous alkali solution is aqueous sodium hydroxide.

9. The method of separating a ketone from an aqueous mixture of ketone, aldehyde, alcohol, and ester components difficult to separate by ordinary fractional distillation and which boil in the boiling range of aqueous $C_1$ to $C_5$ alcohols, which comprises introducing the aqueous mixture into a fractional distillation zone, introducing sufficient aqueous alkali solution into the fractional distillation zone at a point substantially above the feed point of the mixture to maintain an internal liquid reflux having a water content of 50 mol per cent to 75 mol per cent below the point of addition of the aqueous alkali and to maintain a pH of 7.1 to 12.5 in the fractional distillation zone during the distillation, distilling from said feed mixture a vaporous mixture which flows countercurrent to the aqueous alkali reflux, and withdrawing overhead from said fractional distillation zone a vapor product of the ketone substantially freed of the aldehyde, alcohol and ester components.

10. A process according to claim 9 in which the aqueous alkali solution is aqueous sodium hydroxide.

CARL S. CARLSON.
PAUL V. SMITH, JR.

REFERENCES CITED

The following references are of record in the file of this patent:

UNITED STATES PATENTS

| Number | Name | Date |
| --- | --- | --- |
| 2,179,991 | Bright | Nov. 14, 1939 |
| 2,198,651 | Bludworth | Apr. 30, 1940 |
| 2,283,911 | Brant et al. | May 26, 1942 |
| 2,321,748 | Hopkins | June 15, 1943 |
| 2,381,032 | Bludworth et al. | Aug. 7, 1945 |